United States Patent [19]

Fukushima

[11] Patent Number: 5,546,381
[45] Date of Patent: Aug. 13, 1996

[54] SPREAD SPECTRUM COMMUNICATION SYSTEM AND METHOD, USING SEQUENTIALLY PHASE SHIFTED M-SEQUENCE CODES

[75] Inventor: Akio Fukushima, Tokyo-to, Japan

[73] Assignee: Pioneer Electronic Corporation, Tokyo-to, Japan

[21] Appl. No.: 397,872

[22] Filed: Mar. 2, 1995

[30] Foreign Application Priority Data

Mar. 2, 1994 [JP] Japan ................................ 6-032614

[51] Int. Cl.⁶ ........................................... H04J 13/04
[52] U.S. Cl. .................................................... 370/18
[58] Field of Search .............................. 370/18, 19, 107; 375/205, 206, 367; 380/42, 46, 50; 327/164

[56] References Cited

U.S. PATENT DOCUMENTS

| | | | |
|---|---|---|---|
| 3,662,386 | 5/1972 | Bryant | 343/17.1 |
| 4,460,992 | 7/1984 | Gutleber | 370/19 |
| 4,561,089 | 12/1985 | Rouse et al. | 370/18 |
| 4,567,588 | 1/1986 | Jerrim | 370/18 |
| 4,601,047 | 7/1986 | Horwitz | 375/22 |
| 5,103,459 | 4/1992 | Gilhousen et al. | 370/18 |
| 5,170,412 | 12/1992 | Massey | 375/1 |

FOREIGN PATENT DOCUMENTS

| | | |
|---|---|---|
| 62-23634 | 1/1987 | Japan . |
| 62-45233 | 2/1987 | Japan . |
| 5-22251 | 1/1993 | Japan . |

Primary Examiner—Douglas W. Olms
Assistant Examiner—Matthew C. Phillips
Attorney, Agent, or Firm—Young & Thompson

[57] ABSTRACT

A spread spectrum communication method includes the steps of: spread-spectrum-modulating each of a plurality of data signals to be transmitted on the basis of a plurality of coding signals respectively assigned to the data signals, the coding signals comprising M-sequence codes, which have code patterns same to each other and which phases are sequentially shifted from each other; multiplexing the spread-spectrum-modulated signals; transmitting the multiplexed signals through a transmission path; and selectively demodulating desirable one of the transmitted signals by spread-spectrum-demodulating the transmitted signals on the basis of a decoding signal comprising a M-sequence code, which has a code pattern same as that of the coding signals and which phase is variable, and by controlling the phase of the decoding signal to be in synchronization with the phase of the coding signal assigned to the desirable one of the transmitted signals.

13 Claims, 8 Drawing Sheets

PHASE SHIFT POINT

- CORRELATION OUTPUT-1
- CORRELATION OUTPUT-2
- TRACE POINT
- COMPOSITE CORRELATION FUNCTION

FIG. 12

SPREAD SPECTRUM COMMUNICATION SYSTEM AND METHOD, USING SEQUENTIALLY PHASE SHIFTED M-SEQUENCE CODES

BACKGROUND OF THE INVENTION

1. Field of the Invention

The present invention generally relates to a transmission technique for multiplexing signals by means of what is called a spread spectrum modulation, and more particularly to a multiplex communication method of multiplexing signals, which are spread-spectrum-modulated by a plurality of transmitting apparatuses, and spread spectrum transmitting and receiving apparatuses. 2. Description of the Related Art A spread spectrum modulation is a modulation method of transmitting a signal to be transmitted in a band width wider than a band width which is required to transmit the signal to be transmitted. More concretely, this technique is a technique to further modulate an ordinary modulated signal, which has been primarily modulated, by use of a special pseudo-random (PN) signal (i.e. a spectrum cyclic code), so as to spread the spectrum distribution. This technique is explained, for example, in Japanese Patent Application Laid Open No. Hei.5-22251, in detail.

Figure 1:
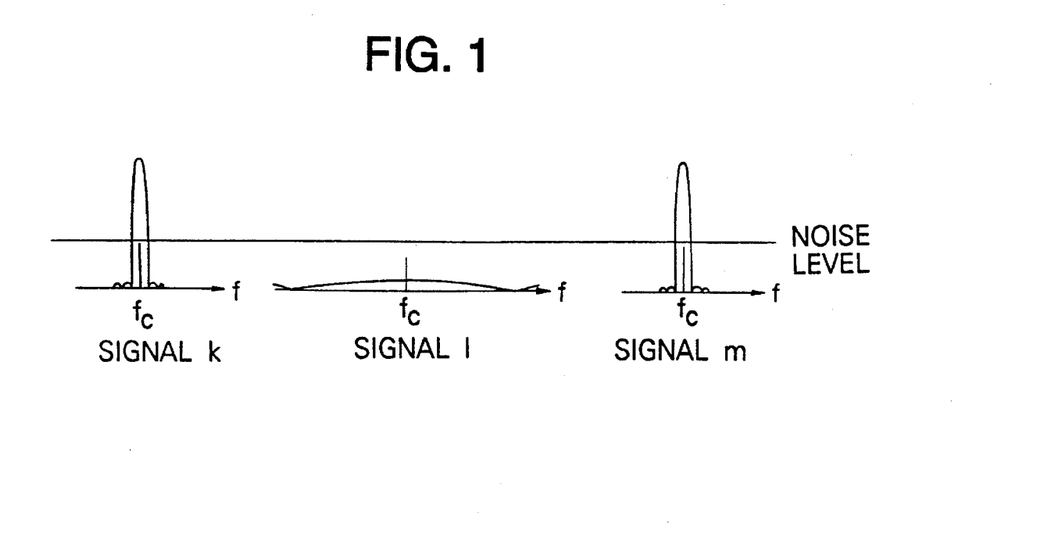
FIG. 1 is a diagram for explaining a basic concept of the spread spectrum communication method.

The basic operation of the spread spectrum modulation and demodulation, is explained here with referring to FIG. 1. A signal to be transmitted, which is inputted through a microphone for example, is modulated to be a primarily modulated signal $k$. This modulation may be performed by means of various analog to digital modulation method the AM (Amplitude Modulation) method, the FM (Frequency Modulation) method, the ASK (Amplitude Shift Keying) modulation method, the FSK (Frequency Shift Keying) modulation method. This primarily modulated signal $k$ has a band width as shown in FIG. 1. As shown in FIG. 1, the signal $k$ has a relatively sharp signal peak at a frequency fc of the carrier wave, and has a relatively narrow band width. Next, the spread spectrum modulation is performed by use of a cyclic code, which is a pseudo-random signal, and a secondarily modulated signal $l$ having a band width as shown in FIG. 1, is transmitted from a transmitting apparatus. As shown in FIG. 1, the secondarily modulated signal $l$ has a signal peak smaller than the primarily modulated signal $k$ at the frequency fc of the carrier wave, and has a band width wider than the primarily modulated signal $k$. Then, a receiving apparatus receives this secondarily modulated signal $l$ and spread-spectrum-demodulates this received signal by use of the same cyclic code as the one used on the side of the transmitting apparatus, so as to obtain a primarily demodulated signal $m$ as shown in FIG. 1, which is substantially the same as the primarily modulated signal $k$. Then, this primarily demodulated signal $m$ is further demodulated to be an audio signal and outputted as audio sound from a speaker.

In an ordinary transmission path, the transmitted signal is influenced by a disturbance such as a noise. Thus, in case of the transmitted signal having a relatively narrow band width such as the signal $k$ or the signal m shown in FIG. 1, the original signal cannot be recovered if noise exists at the vicinity of the carrier wave frequency fc. However, in case of the transmitted signal having the relatively wide band width such as the signal $l$ shown in FIG. 1, the whole portion of the transmitted signal is not lost and the transmitted signal can be recovered even if the transmitted signal has a signal level lower than the noise level. In this manner, the spread spectrum modulation has a good characteristics of opposing against the noise or external disturbance, a good characteristic of having a small signal spectrum density in the transmission path and a good characteristic of keeping the secret of the signal transmission since the spectrum is spread by virtue of the secondary modulation.

There is a first type of multiplex communication system by means of the above explained spread spectrum modulating and demodulating method, in which the signals emitted from a plurality of transmitting apparatuses are multiplexed and transmitted through a transmission path. In each of the transmitting apparatuses, the data to be transmitted is primarily modulated and is then secondarily modulated on the basis of the cyclic code to be outputted onto the transmission path, so that the secondarily modulated signals outputted from the transmitting apparatuses are multiplexed on the transmission path. The cyclic codes used in the transmitting apparatuses are different from each other.

The receiving apparatus receives these multiplexed signals. The received signals are demodulated to be the primarily modulated signals on the basis of the cyclic code generated in the receiving apparatus. Then, it is further demodulated to be the original signals. The transmitting apparatuses prepare pseudo-random codes (e.g. gold code, M-sequence code) different from each other as cyclic codes. In the receiving apparatus, a plurality of cyclic codes are prepared, which correspond to the cyclic codes used in the transmitting apparatuses, and are generated in synchronization with the phase, such that only one of the cyclic codes is sequentially selected.

Figure 2:
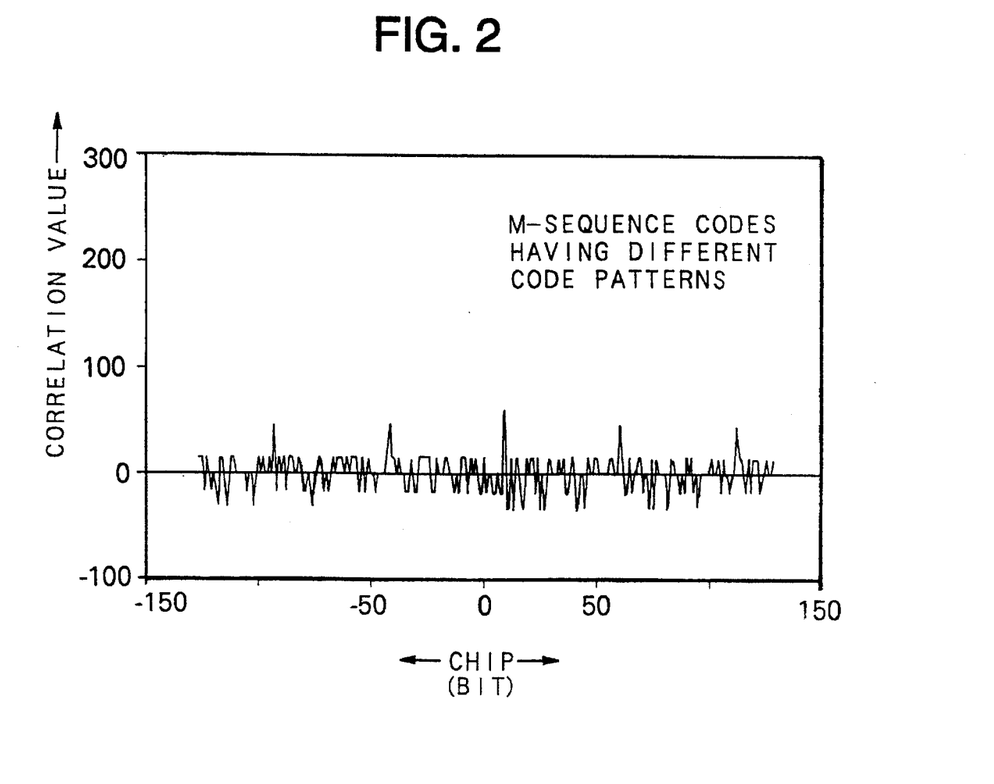
FIG. 2 is a graph showing a cross correlation between M-sequence codes having code patterns different from each other.

However, this first type of multiplex communication system has such a problem that a cross correlation between the different channels is considerably large. FIG. 2 shows such a cross correlation between the M-sequence codes having the code patterns different from each other in case where the M-sequence codes are utilized as the spectrum cyclic codes. The abscissa represents the chip number (bit number), wherein the chip represents the phase of the cyclic code for the spread spectrum and indicates the phase difference of the 1 bit clock when it is returned to the initial value after cycling by predetermined bit numbers.

Here, the correlation means such a relationship between two pseudo-random codes that those two codes are coincident to each other at each moment of time. The cross correlation means the correlation between codes which have the code patterns different from each other. The self correlation means the correlation between the codes having the code patterns same to each other. The degree of the correlation is expressed by the correlation value. This correlation value is expressed as a value which is obtained by subtracting the number of the inconsistent bits from the number of the coincident bits when the code sequences are compared with each other as for each bit. As this correlation value becomes larger, the correlation of the compared codes becomes stronger. As the correlation value becomes smaller, the correlation becomes weaker. Further, as the correlation value of the self correlation becomes higher, the demodulation of the transmitted signal becomes easier. As the correlation value of the cross correlation becomes lower, the mutual interference becomes smaller. Therefore, it is the better as the self correlation of the spread spectrum modulated signal and the cyclic code of the transmission object is the larger while the cross correlation is the smaller in relationship with the other spread spectrum modulated signal.

In FIG. 2, the amplitude on the coordinate axis represents the strength of the correlation, and the abscissa represent the shift in the phase of the coded signals between the M-sequence codes having code patterns different from each other. According to FIG. 2, the considerable magnitude of cross correlation exists regardless of the value of the phase (i.e. the chip or bit), and the strong correlation is appeared by a certain interval.

It is therefore concluded here that the correlation between the codes having code patterns different from each other is too strong according to this type of system.

Further, the gold code is the typical code for the spread spectrum modulation. However, the cross correlation between the spread-spectrum-modulated signals having the code patterns different from each other cannot be concluded enough in the gold code although the gold code is slightly superior to the M-sequence code. If the gold code is used in order to improve the cross correlation value, the randomization characteristic is degraded in turn. Here, the randomization characteristic means how much the codes are randomized. Furthermore, in the ordinary spread spectrum transmission, a more special code may be utilized. However, the randomization characteristic of such a special code is even worse than this gold code.

There is a second type of multiplex communication system by means of the aforementioned spread spectrum modulating and demodulating method, which has a basic construction same as that of the above explained first type. However, in this second type, the cyclic codes used in the transmitting apparatuses are synchronized to each other by virtue of a synchronization clock commonly supplied to all of the transmitting apparatuses. Thus, the mutual disturbances between the transmitted signals, which have been cyclic-coded, are restrained because the synchronization is achieved between the transmitting apparatuses.

In the above multiplex communication system, the transmission path may be a wire type such as a cable, or a wireless type such as an electric wave transmission in practice.

However, in this second type of multiplex communication system, if the synchronization cannot be precisely achieved between the transmitting apparatuses, the cross correlation value is changed in the same manner as the case of the aforementioned first type of multiplex system.

Furthermore, in the first and second types of multiplex communication systems, when the jitter or fluctuation is generated in the clock for code generation in the transmitting apparatuses, the cross correlation value is even more changed so that the transmission characteristic becomes unstable, which is another serious problem.

In addition, these first and second types of multiplex communication systems by means of the spread spectrum modulation are explained in more detail in Japanese Patent Application Laid Opens No. Sho. 62-45233 and No. Sho. 6223634, in which the gold code is utilized as a typical cyclic code for the spread spectrum modulation.

SUMMARY OF THE INVENTION

It is therefore an object of the present invention to provide a spread spectrum communication method, a spread spectrum transmitting apparatus, a spread spectrum receiving apparatus and a spread spectrum communication apparatus, in which the cross correlation between the multiplexed signals can be diminished.

The above object of the present invention can be achieved by a spread spectrum communication method including the steps of: spread-spectrum-modulating each of a plurality of data signals to be transmitted on the basis of a plurality of coding signals respectively assigned to the data signals, the coding signals comprising M-sequence codes, which have code patterns same to each other and which phases are sequentially shifted from each other; multiplexing the spread-spectrum-modulated signals; transmitting the multiplexed signals through a transmission path; and selectively demodulating a desirable one of the transmitted signals by spread-spectrum-demodulating the transmitted signals on the basis of a decoding signal comprising a M-sequence code, which has a code pattern same as that of the coding signals and which phase is variable, and by controlling the phase of the decoding signal to be in synchronization with the phase of the coding signal assigned to the desirable one of the transmitted signals.

According to the communication method of the present invention, on the transmitting side, the spread spectrum modulation is performed on the basis of the M-sequence codes which have code patterns same to each other and whose phases are sequentially shifted from each other. Thus, the cross correlation between the modulated signals can be diminished. At the same time, the times of the modulated signals when the self correlation has the sharp peak are different from each other. Accordingly, the spread spectrum modulation can be performed on the transmitting side. On the receiving side, the M-sequence code of the decoding signal has a code pattern same as that of the coding signals, and the phase of the M-sequence code is variable. The decoding signal of this kind may be generated by use of a PLL (Phase Lock Loop) circuit. Thus, by controlling the phase of the decoding signal, only the data signal which self correlation has the sharp peak at the pertinent phase can be selectively spread-spectrum-demodulated.

In the communication method of the present invention, the spread-spectrum-modulating step and the spread-spectrum-demodulating step may be performed by means of the PSK (Phase Shift Keying) modulation, the QPSK (Quad PSK) modulation, the FSK modulation, the ASK modulation, the FM, the AM or the PAM (Pulse Amplitude Modulation).

In one aspect of the communication method of the present invention, in the spread-spectrum-modulating step, the phases of the M-sequence codes are shifted from each other on the basis of one standard signal commonly used for all spread-spectrum-modulating operations of the data signals. In this case, the standard signal may be generated at a transmitting side. Alternatively, the standard signal may be generated at a receiving side and be transmitted through the transmission path to a transmitting side.

In another aspect of the communication method of the present invention, the method further includes the steps of: primarily-modulating a plurality of original signals to be the data signals before the spread-spectrum-modulating step; and secondarily-demodulating the spread-spectrum-demodulated signals to recover the original signals. In this case, the primarily-modulating step and the secondarily-demodulating step may be performed by means of the AM, PAM, FM, the ASK modulation or FSK modulation.

The above object of the present invention can be also achieved by a spread spectrum transmitting apparatus provided with: a plurality of code generation units for generating a plurality of coding signals respectively assigned to a plurality of data signals to be transmitted, the coding signals comprising M-sequence codes which have code patterns same to each other and which phases are sequentially shifted from each other; a plurality of modulation units for spreadspectrum-modulating the data signals on the basis of the coding signals generated by the code generation units; and a multiplex unit for multiplexing the spread-spectrum-modulated signals.

According to the transmitting apparatus of the present invention, the code generation units generate the coding signals comprising the M-sequence codes, which have code patterns same to each other and which phases are sequentially shifted from each other. Then, the modulation units spread-spectrum-modulate the data signals on the basis of the coding signals generated by the code generation units. Accordingly, the cross correlation between the modulated signals can be diminished. At the same time, the times of the modulated signals when the self correlation has the sharp peak are different from each other. Accordingly, the spread spectrum modulation can be performed.

In one aspect of the transmitting apparatus of the present invention, the transmitting apparatus is further provided with a standard signal generation unit for generating a standard signal and commonly supplying the standard signal to the code generation units, wherein the code generation units shift the phases of the M-sequence codes from each other on the basis of the standard signal supplied from the standard signal generation unit.

In another aspect of the transmitting apparatus of the present invention, the multiplex unit comprises a mixer, which achieves impedance matching between the spread-spectrum-modulated signals.

The above object of the present invention can be also achieved by a spread spectrum receiving apparatus for receiving the multiplexed spread-spectrum-modulated signals through a transmission path from the above described transmitting apparatus of the present invention. The receiving apparatus is provided with: a code generation unit for generating a decoding signal, the decoding signal comprising a M-sequence code, which has a code pattern same as that of the coding signals and which phase is variable; and a demodulation unit for selectively demodulating desirable one of the received signals by spread-spectrum-demodulating the received signals on the basis of the decoding signal by controlling the code generation unit to vary the phase of the decoding signal so as to be in synchronization with the phase of the coding signal assigned to the desirable one of the received signals.

According to the receiving apparatus of the present invention, the code generation unit generates the decoding signal comprising the M-sequence code, which has a code pattern same as that of the coding signals and which phase is variable. Then, the demodulation unit spread-spectrum-demodulates the received signals on the basis of the decoding signal. Accordingly, by controlling the code generation unit to vary the phase of the decoding signal, only the data signal whose self correlation has the sharp peak at the pertinent phase can be selectively spread-spectrum-demodulated.

In one aspect of the receiving apparatus of the present invention, the code generation unit is provided with: a phase lock circuit for generating a standard signal in synchronization with the received signals; and a M-sequence code generation circuit for generating the decoding signal on the basis of the standard signal generated by the phase lock circuit.

The above object of the present invention can be also achieved by a spread spectrum communication apparatus provided with: the above described transmitting apparatus of the present invention; the above described receiving apparatus of the present invention; and a transmission path for transmitting the multiplexed signals from the transmitting apparatus to the receiving apparatus.

According to the communication apparatus of the present invention, the spread spectrum modulation can be performed on the transmitting side, while only the data signal whose self correlation has the sharp peak at the pertinent phase can be selectively spread-spectrum-demodulated on the receiving side.

In one aspect of the communication apparatus of the present invention, the communication apparatus is further provided with a standard signal generation unit disposed on the transmitting side for generating a standard signal and commonly supplying the standard signal to the code generation units of the transmitting apparatus through a standard signal line disposed on the transmitting side, wherein the code generation units of the transmitting apparatus shift the phases of the M-sequence codes from each other on the basis of the standard signal supplied from the standard signal generation unit. This constitution of the present invention is available in case that locations of transmitters, which respectively include the code generation units of the transmitting apparatus, are close to each other enough to connect them by the standard signal line such as a wire line.

In another aspect of the communication apparatus of the present invention, the communication apparatus is further provided with: a standard signal generation unit disposed on the receiving side for generating a standard signal; a standard signal transmitting unit disposed on the receiving side for transmitting the generated standard signal through the transmission path; and a standard signal receiving unit disposed on the transmitting side for receiving the transmitted standard signal and commonly supplying the received standard signal to the first code generation units, wherein the first code generation units shift the phases of the M-sequence codes from each other on the basis of the standard signal supplied through the standard signal receiving unit. This constitution of the present invention is available in the case that locations of transmitters, which respectively include the code generation units of the transmitting apparatus, are too distant from each other to connect them by the standard signal line.

In another aspect of the communication apparatus of the present invention, the communication apparatus is further provided with: a plurality of primarily-modulating units disposed on the transmitting side for primarily-modulating a plurality of original signals and outputting the data signals to the modulation units, respectively; and a secondarily-demodulating unit disposed on the receiving side for secondarily-demodulating the spread-spectrum-demodulated signal to recover the original signal corresponding to the desired one of the transmitted signals.

In another aspect of the communication apparatus of the present invention, the code generation units of the transmitting apparatus generate the coding signals such that the phases of the coding signals are shifted by a predetermined time period, and the demodulation unit controls the code generation unit of the receiving apparatus to vary the phase of the decoding signal by the predetermined time period when changing the desirable one of the transmitted signals.

Here, the principle of the above described present invention is explained in more detail. The spread spectrum modulated signals can be demodulated more easily and reliably by use of the codes whose correlation is stronger. On the other hand, the spread-spectrum-modulated signals are more difficult to demodulate by use of the codes which correlation is weaker, so that, from a view point of the demodulating device in the receiving apparatus, the modulated signals seems to be merely noise. Namely, even if there exist a plurality of spread-spectrum-modulated signals which have been coded, it is still possible to select only the signal modulated by use of the code, which has the higher correlation, to demodulate the selected signal. Therefore, in the multiplexing communication method by use of the spread spectrum modulation, it is required such a correlation of the codes related to the demodulation of the modulation that the self correlation of the signal to be recovered is high and that the cross correlation with the different signal is low.

Figure 3:
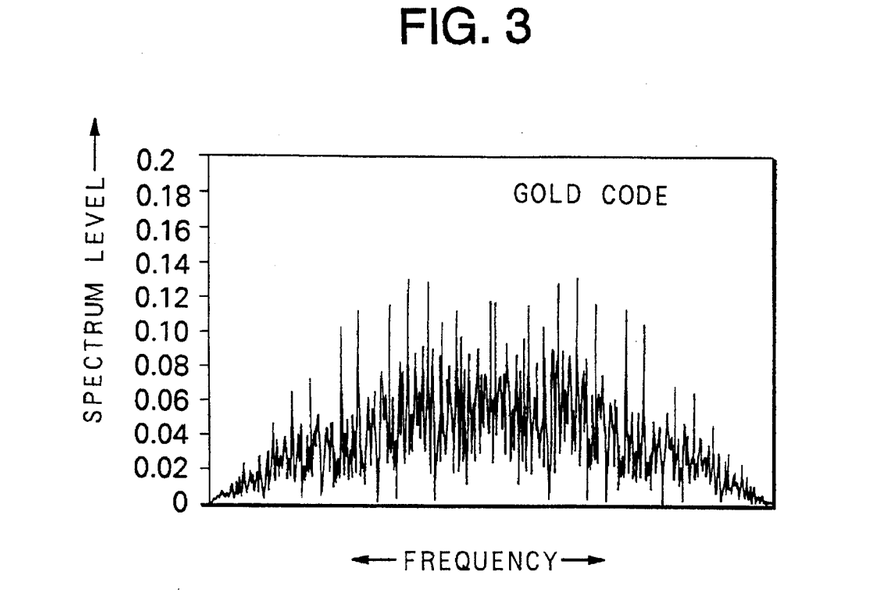
FIG. 3 is a graph showing a spectrum distribution of the gold code.
Figure 4:
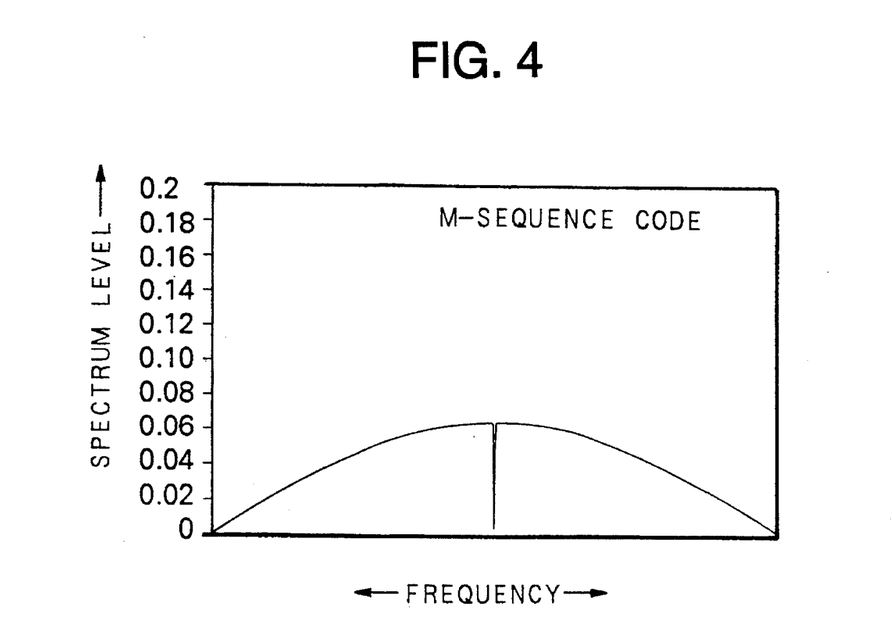
FIG. 4 is a graph showing a spectrum distribution of the M-sequence code.

In order to investigate the correlation of the spread spectrum codes, the spectrum distributions of the gold code and the M-sequence code are shown in FIGS. 3 and 4. FIG. 3 shows the spectrum distribution of the gold code, while FIG. 4 shows the spectrum distribution of the M-sequence code. From the spectrum distributions shown in those figures, it is understood that the gold code is inferior to the M-sequence code in the randomization characteristic. Normally, the spread capability in the spread spectrum transmission is determined by the degree of randomization of the code. Therefore, the M-sequence code is the most excellent in the randomization characteristic. It becomes possible to achieve the better spread capability by utilizing the M-sequence code.

Figure 5:
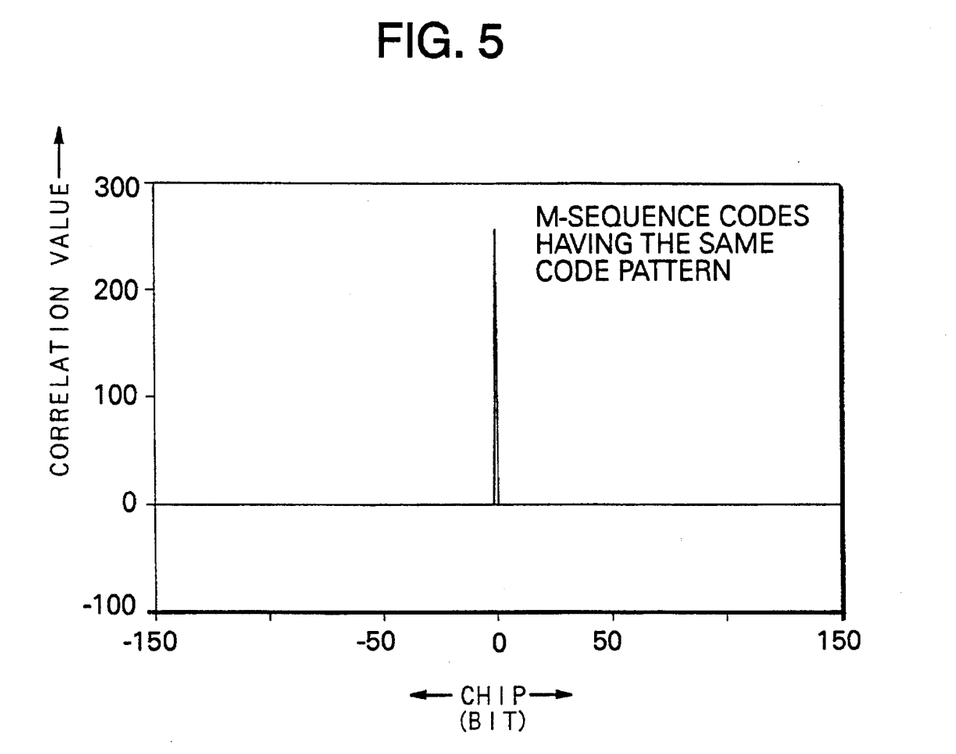
FIG. 5 is a graph showing a cross correlation between the M-sequence codes having code patterns same to each other.

The self correlation between the M-sequence codes is shown in FIG. 5. As shown in FIG. 5, the self correlation between the M-sequence codes, which have the code patterns same to each other, becomes the maximum value when the phases of them are coincident to each other (i.e. at the phase =0). On the other hand, this self correlation becomes a very small constant value when the phases of those two codes are not coincident to each other. Thus, it is concluded that this M-sequence code is suitable for multiplexing. When the M-sequence codes which have the code patterns different from each other are utilized, the change of the correlation is severe even if the phases are coincident to each other or even if the phases are not coincident to each other, so that this is not suitable for multiplexing as shown in FIG. 2.

By the above investigation, it is understood that the usage of the M-sequence codes, which have the code patterns same to each other, is suitable for the spread spectrum multiplexing system. However, when the multiplexing method is performed in the wireless communication by use of the M-sequence codes, a following problem occurs.

In case of the wireless communication, during the transmission of the electric wave, there exist a direct wave, which is directly transmitted, and some reflected waves, which are reflected by a building, a mountain etc. to be transmitted. This kind of transmission is called as a multipath transmission. There may happen a case where the reflected waves are stronger than the direct wave. In this case, the reflected waves are received with a certain time delay relative to the direct wave. The time duration of this time delay is generally smaller than the cycle of the spread code. Thus, just by receiving one spread-spectrum-modulated wave, there exist a plurality of peaks in the self correlation, so that it is not practical to perform the wireless transmission by use of the M-sequence codes having the code patterns same to each other. On the contrary, in case that the spread spectrum transmission is performed by use of a cable, a good self correlation can be achieved since there hardly exists the influence of the reflected waves.

Accordingly, in the present invention, the spread spectrum modulation communication by use of a cable is premised, and the M-sequence code is used as the pseudo-random signal. Further, the coding and decoding operations are performed by use of the M sequence codes, which have the code patterns same to each other, in the transmitting apparatuses and the receiving apparatus. Thus, the spread spectrum multiplex communication in which the cross correlation is very small can be performed according to the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6, which consist of FIG. 6A and FIGS. 6B–6F, are figures to explain the spread spectrum communication method used in embodiments of the present invention, wherein

DETAILED DESCRIPTION OF THE PREFERRED EMBODIMENTS

Referring to the accompanying drawings, embodiments of the present invention will be now explained.

Basic Principle of Spread Spectrum Modulation

First of all, the basic principle of the spread spectrum modulation used in embodiments of the present invention will be explained with referring to FIGS. 6 and 7.

FIG. 6 explain the case where the PSK (Phase Shift Keying) modulation is applied to a simple carrier wave, which corresponds to a primarily modulated signal in embodiments of the present invention, in order to explain the basic principle of the spread spectrum modulation.

Figure 6A:
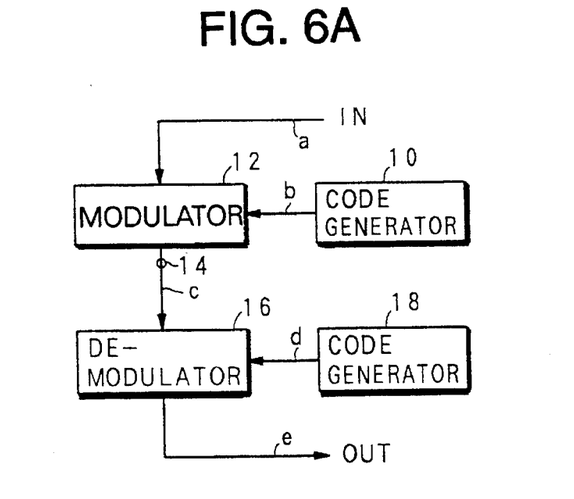
FIG. 6A is a block diagram of the communication system and FIGS. 6B–6F are a signal charts of each signal in the communication system of FIG. 6A.
Figure 6B:
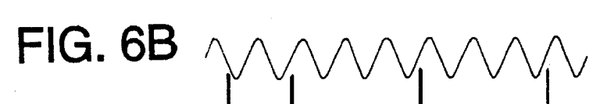
Figure 6C:
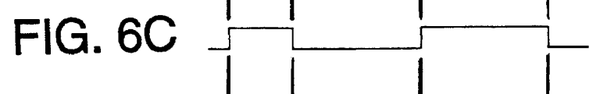
Figure 6D:
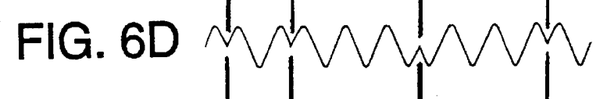
Figure 6E:
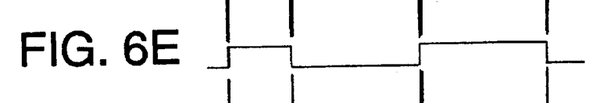
Figure 6F:
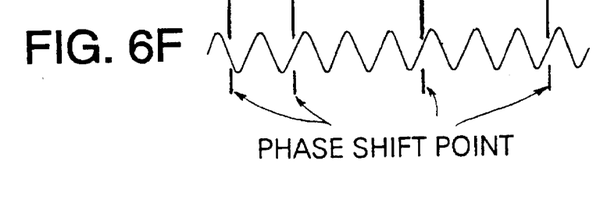

In FIG. 6A, a carrier wave a from an input terminal IN is inputted to a modulator 12 on the side of a transmitting apparatus. The modulator 12 applies the PSK modulation to the inputted carrier wave a in correspondence with a bit condition ("0" or "1") of a digital code b which is generated by a code generator 10. Then, the carrier wave a (which corresponds to a primarily modulated signal in embodiments of the present invention) is modulated into a secondarily modulated wave c to be transmitted through a transmission path 14. The secondarily modulated wave c is in such a condition that the frequency band range is spread by the frequency of the digital code b (i.e. the spread-spectrum code). In this manner, the frequency of the carrier wave a is spread in its frequency component in correspondence with the randomization characteristic of the spread-spectrum code (i.e. the digital code b) and is transmitted onto the transmission path 14 (namely, the spectrum distribution is spread, so that this method is called as a "spread-spectrum modulation" method).

Further, the secondarily modulated waveform c is inputted to a demodulator 16 on the side of a receiving apparatus. A code d is generated by a code generator 18. The code pattern of the code d is substantially same as that of the code b generated by the code generator 10, and the code d is synchronized with the code b (namely, the phase of the code d is also the same as that of the code b). As the demodulator 16 performs the PSK demodulation by use of the code d, a signal e which is the same as the original signal i.e. the carrier wave a can be recovered.

Here, the PSK modulation is employed for the spread spectrum modulation method. However, it is easily understood that other modulation methods such as FSK modulation, ASK modulation, PAM, FM, AM modulation etc., may be employed in the present invention. The secondary modulation by means of the PSK modulation is suitable from view points of the carrier wave detection, the electric power efficiency, the economics of the circuit and so on.

Here, the M-sequence code is used as a code generated from the code generator. The code in the spread spectrum modulation has such an important role that the type of the code, the code length and the code speed give the limitation for the capability of the communication system. On the circuit construction, it is preferred that the code having the good randomization characteristic can be generated by a circuit as simple as possible, and the code for the demodulation can be also easily generated at the time of demodulation. The M-sequence code fulfills this requirement, and is the most excellent code presently available in the fields of the communication and the distance measurement.

Figure 7:
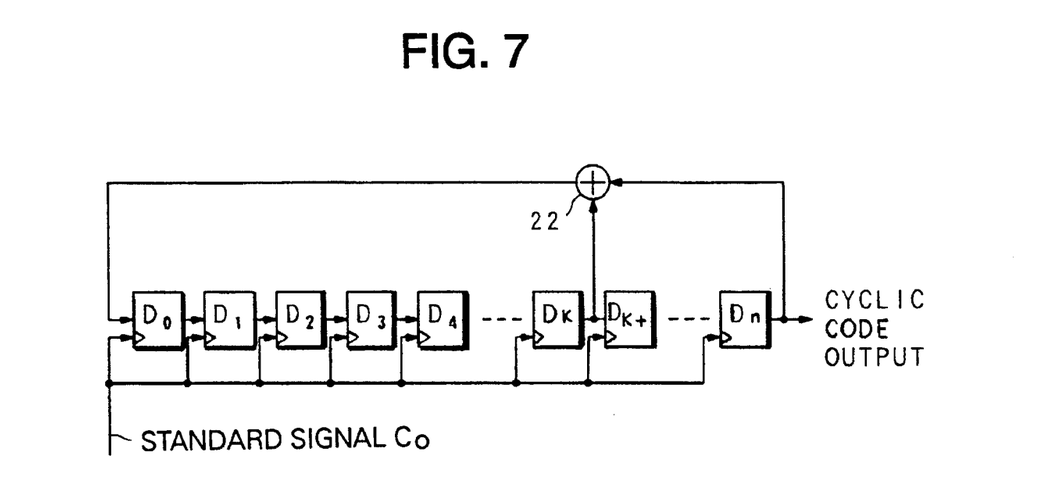
FIG. 7 is a circuit diagram of a basic circuit of a $\underline{n}$ dimensional M-sequence code generator used in embodiments of the present invention.

FIG. 7 shows a basic circuit construction of the M-sequence code generator. In FIG. 7, reference marks Do to Dk and Dk+1 to Dn represent delay elements respectively, each of which consists of a flipflop, for example. These delay elements constitute a shift register on the whole. An adder 22 adds the output of the flipflop Dk and the final output, to generate an input signal again. Therefore, different values are inputted in the shift register as it performs shifting, so that the change appears in the output. The signal generated by the circuit as shown in FIG. 7, is called as a maximum cycle sequence (i.e. M-sequence) code, and is a pseudo-random signal having a high randomization characteristic. Assuming the number of the stages of the shift register related to the M-sequence code is n, the code sequence which can be generated by this M-sequence code generator is equal to $2^n-1$. The sequence of this pseudo-random signal generated by the M-sequence code generator is greatly changed by various factors such as the number of the stages of the shift register, the initial value and the position of the taking-out-tap to the adder. The clock number, which is necessary for one cycle from a code of the initial value until a code which value is coincident to the initial value, can be determined by the combination of these factors.

In the present invention, a coding signal, which has the good randomization characteristic, can be generated by use of the M-sequence code generator as shown in FIG. 7.

First Embodiment

The first embodiment is constructed such that the signals to be transmitted, which are spread-spectrum-modulated in a plurality of transmitters in the transmitting apparatus, are multiplexed, and are transmitted to a receiving apparatus through a transmission path. The multiplexing operation is performed such that a standard signal as a synchronization signal is commonly used in the transmitters while the phase of the codes in the transmitters are respectively shifted.

Figure 8:
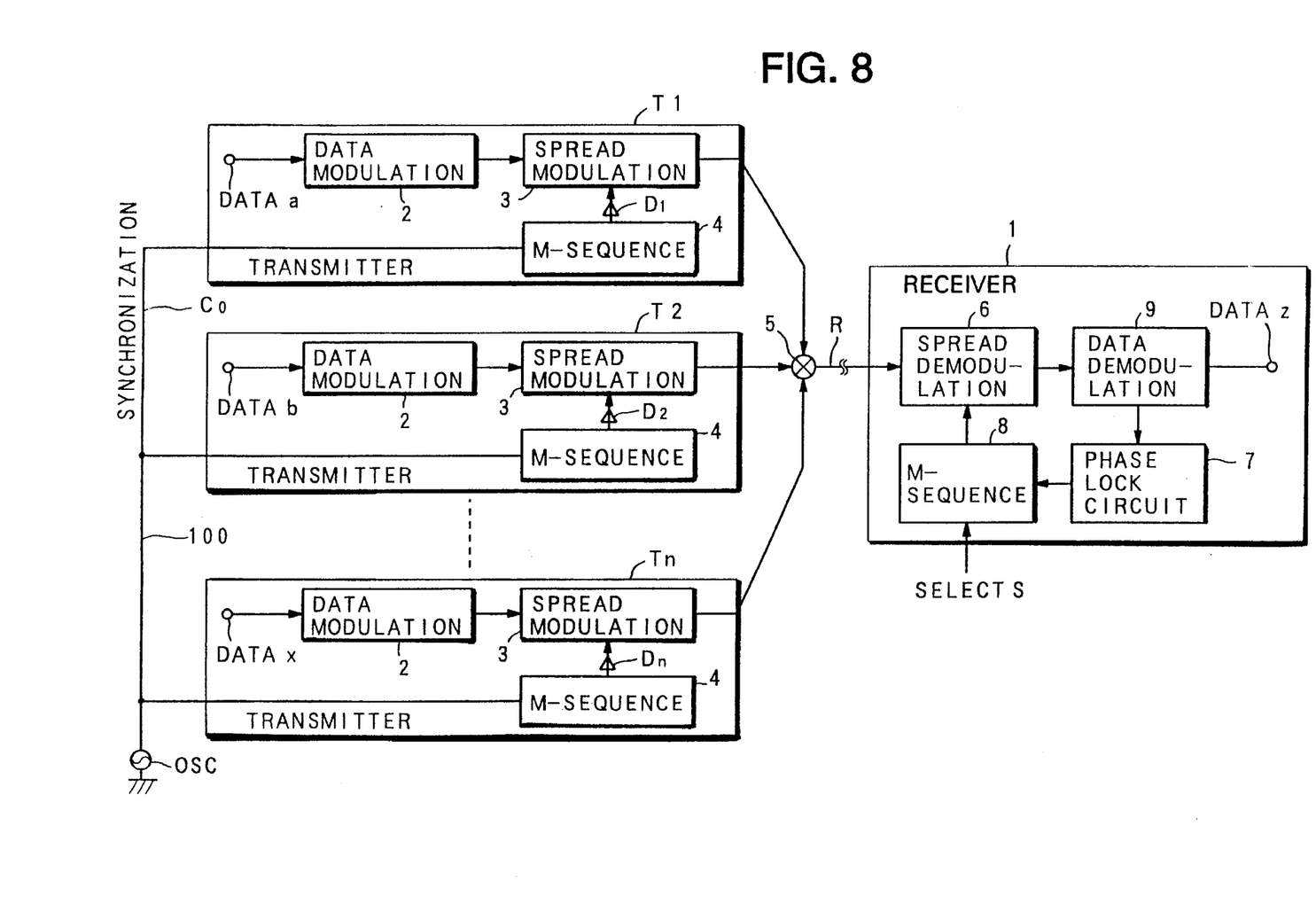
FIG. 8 is a block diagram of a spread spectrum transmitting and receiving apparatuses as a first embodiment of the present invention.
Figure 9A:
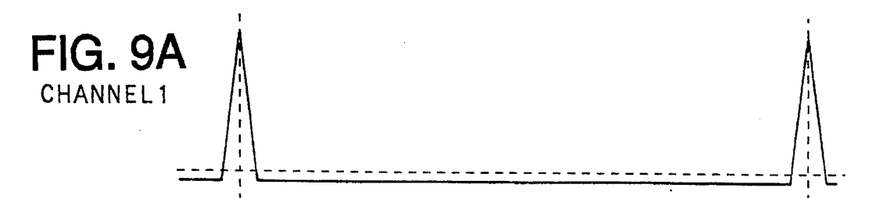
FIGS. 9A–9E are diagrams for explaining the multiplexing operation in the spread spectrum communication method in the first embodiment for channels 1,2,3,10 and multiplex, respectively.
Figure 9B:
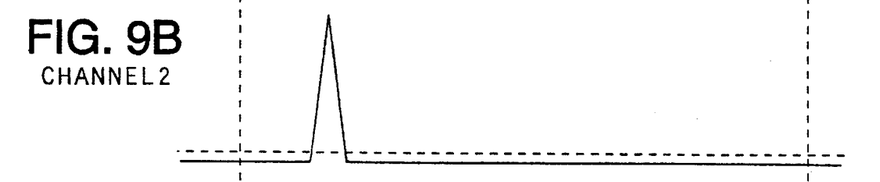
Figure 9C:
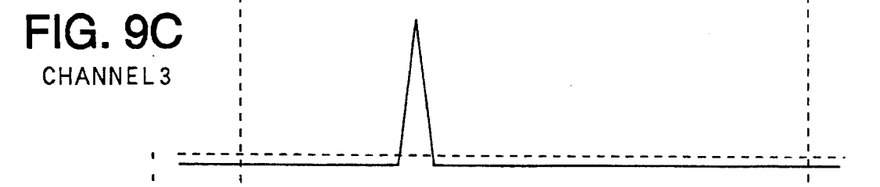
Figure 9D:
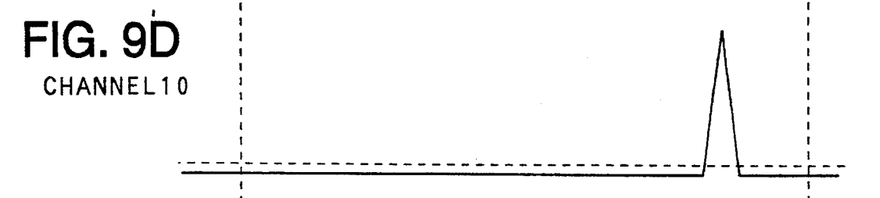
Figure 9E:
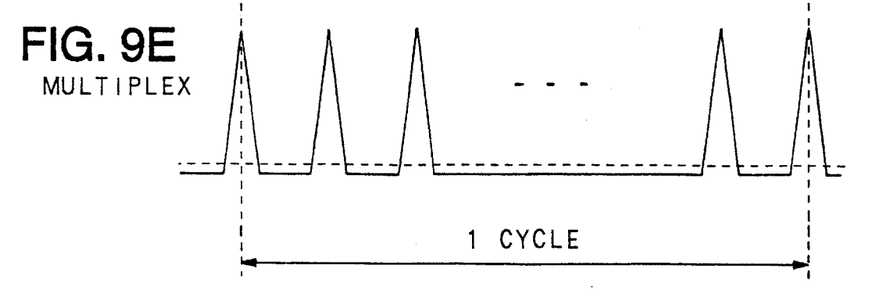

FIG. 8 shows a construction of the first embodiment of the present invention. As shown in FIG. 8, the spread spectrum transmitting and receiving apparatuses of the first embodiment are provided with a plurality of transmitters T1 to Tn, a mixer 5, a transmission path R and a receiver 1.

Each of the transmitters T1 to Tn is provided with: a data modulation circuit 2 for primarily modulating a data signal to be transmitted; a spread modulation circuit 3 for performing the spread spectrum modulation of the primarily modulated signal to be transmitted by use of the coding signal; a M-sequence code generation circuit 4 for generating the coding signal of the M-sequence code; and a phase adjustment circuit Di (i=1, 2, ..., n) for adjusting the phase of the coding signal outputted from the M-sequence code generation circuit 4 (which delay amount is different from transmitter to transmitter). The M-sequence code generation circuit of each transmitter is connected to a synchronization clock line 100, so as to commonly use a standard signals Co and achieve the synchronization therebetween.

The receiver 1 is provided with: a spread demodulation circuit 6 for receiving the multiplexed signals through the transmission path R and spread-spectrum-demodulating the received signals by use of a decoding signal; a phase lock circuit 7 for generating a standard signal synchronized with the multiplexed signals; a M-sequence code generation circuit 8 for generating the decoding signal of the M-sequence code on the basis of the standard signal generated from the phase lock circuit 7; and a data demodulation circuit 9 for secondarily demodulating the primarily demodulated signals, which have been spread-spectrum-demodulated by the spread demodulation circuit 6, to the original signals.

Nextly, the operation of the first embodiment will be explained.

Transmitting Side

The transmitters T1 to Tn receive data a to x as data signals to be transmitted respectively, each of which is unique for each transmitter. Each of the data a to x may be an analog signal or a digital signal. The data modulation circuits 2 primarily modulate these data a to x respectively by use of a predetermined carrier wave. As the primary modulation, various modulation methods may be employed here. It is preferable to determine the type of primary modulation method here in accordance with the type of the data a to x. In any event, the primary modulation methods and the carrier wave frequencies used in all the transmitters T1 to Tn are unified in order to demodulate the primarily modulated signal related to all of the transmitters T1 to Tn by a single demodulating circuit i.e. the data demodulation circuit 9, in the present embodiment. As such a primary modulation method, AM PAM, FM, ASK, or, the FSK modulation method etc. may be employed. It is also possible to use the primary modulation methods and/or the carrier wave frequencies different from the transmitter to the transmitter while a plurality of demodulating circuits for respectively dealing with those differently modulated signals are equipped in the receiver.

On the other hand, the M-sequence code generation circuit 4 in each of the transmitters T1 to Tn receives the standard signal Co and generates the cyclic code according to the standard signal Co. Namely, the M-sequence code generation circuit 4, which has a constitution as shown in FIG. 7, operates its shift register according to the standard signal Co so as to generate the M-sequence code. In each of the transmitters T1 to Tn, the M-sequence code is delayed by corresponding one of the phase adjustment elements D1 to Dn and is supplied to the spread modulation circuit 3 respectively. Here, the phase adjustment elements D1 to Dn are set to have delay-phase-amounts different from each other i.e. sequentially shifted from each other by a predetermined phase amount. By this constitution, the M-sequence codes in the transmitters T1 to Tn are different in phase from each other. The phase adjustment element D may consist of a simple delay element, a buffer, a multi-vibrator and so on.

The standard signal Co is generated by an oscillator (OSC) and is supplied through the synchronization clock line 100 to each of the transmitters T1 to Tn.

Although the number of the stages of the shift register for the M-sequence generator in the M-sequence generation circuit 4 is not particularly limited, the randomization characteristic is improved as the number of the stages is increased. In order to give the self correlation characteristic between a plurality of M-sequence codes, it is important that the numbers of the stages and the initial set values of the shift registers are set the same to each other in all of the M-sequence generation circuit 4 related to the transmitters T1 to Tn. By this constitution, the M-sequence generation circuits 4 are to generate cyclic codes having code patterns same to each other at a timing different from each other. The cyclic codes are supplied to the phase modulation elements D1 to Dn, are phase-modulated to have the different phases and are supplied to the spread modulation circuits 2, respectively. Various kinds of modulation methods can be employed here as aforementioned in the explanation for the basic principle.

The secondarily modulated signals in the transmitters T1 to Tn are added by the mixer 5 in order to achieve the impedance matching, and are supplied to the transmission path R. On condition that the impedance matching between the transmitters T1 to Tn is achieved in the spread modulation circuits 3, the outputs of the spread modulation circuits 3 may be directly connected to the transmission path R.

FIG. 9 shows the multiplexing operation for the spread spectrum modulation. The abscissa indicates the phase (time). The cycle of the code in each M-sequence code which is the time for the code to return to its original value is indicated as "1 cycle" in the figure. One channel corresponds to one transmitter (for example, the spread spectrum modulated signal of the transmitter T1 corresponds to the channel 1 in FIG. 9). As shown in FIG. 9, a sharp peak of the self correlation of the M-sequence code appears cyclically. The cycle of the sharp peak is uniquely determined by the code speed, the code value and the number of the stages of the M-sequence code. The coding signals of all of the transmitters have these factors same to each other and have the phases slightly and sequentially shifted from each other, so that the phase at which the self correlation has the sharp peak is slightly and sequentially shifted from the channel to the channel. As shown in FIG. 1, the spread spectrum modulated and multiplexed signal has the spectrum distribution which has the amplitude lower than the noise level and which is spread over the wide band range with a center positioned at the carrier frequency related to the data modulation circuit 2, when it is observed in the frequency domain. Thus, the multiplexed signals can be transmitted without the influence of the noise etc.

In order to make the M-sequence code generated on the side of the transmitters be different in phase from each other, the delay-time-amounts are adjusted by equipping the phase adjustment elements D1 to Dn as explained above. Instead, the values of the shift registers at the initial value may be shifted. In this case, CPUs in the transmitters may respectively set the values of the shift registers of the M-sequence code generation circuits to be slightly and sequentially shifted one after another.

Receiving Side

The transmitter T1 receives the multiplexed spread-spectrum-modulated signals from the transmission path R in FIG. 8. The spread demodulation circuit 6 demodulates the secondarily modulated received signals to be the primarily modulated signals on the basis of the decoding signal, which is supplied from the M-sequence code generation circuit 8. For example, in accordance with the bit condition of the decoding signal, the multiplexed spread-spectrum-modulated signals are demodulated by the demodulation method corresponding to the modulation method (e.g. the PSK modulation) employed in the spread modulation circuits 3 of the transmitters T1 to Tn. To which transmitter (T1, T2, . . . or Tn) the finally demodulated spread-spectrum-modulated signal corresponds, is determined by the phase of the decoding signal at the moment. However, since the self correlation of the M-sequence code has the sharp peak as shown in FIG. 5, the signal cannot be demodulated if the phase shift between the coding signal related to the transmitter and the decoding signal related to the receiver is not less than 1 bit. In this manner, it is generally difficult to capture the synchronization in the spread spectrum modulation.

Accordingly, in FIG. 8, the phase lock circuit 7 firstly operates the internal VCO (Voltage Controlled Oscillator) to slide the phase of the standard signal, which is generated by the internal clock generator, little by little. This sliding operation may be a stepping operation by a 1/10 bit change or by a 1/8 bit change, for example. The M-sequence code generation circuit 8 generates the decoding signal in accordance with the standard signal which phase is slightly changed in this manner. The spread demodulation circuit 6 calculates the product of this decoding signal and the received signals. The output generated by the spread demodulation circuit 6 is a pseudo-noise which is the product of the received signals and the asynchronous decoding signal in general. Nextly, when the phase of the standard signal reaches the synchronization point with one of the channels in FIG. 9, the coherent output is obtained, so that the carrier wave level related to the primary modulation received by the data demodulation circuit 9 rises up sharply. The data demodulation circuit 9 inputs the amount, which indicates the existence of this signal (i.e. the correlation output), into the phase lock circuit 7 in FIG. 8. The phase lock circuit 7 judges whether the synchronization is achieved or not on the basis of this signal level. In order to judge the synchronization, a PLL (Phase Lock Loop) circuit or an envelope curve wave-detecting circuit may be employed here. The envelop curve wave-detection is such a technique to detect the sharp rising-up at the vicinity of the self correlation point. By this, the synchronization between the coding signal related to the spread spectrum modulation on the transmitter side and the decoding signal related to the spread spectrum demodulation on the receiver side can be achieved. The synchronization detection circuit in the phase lock circuit 7 judges the level of the correlation output and adjusts the phase of the clock generator by driving the internal VCO circuit to capture the synchronization.

Figure 10:
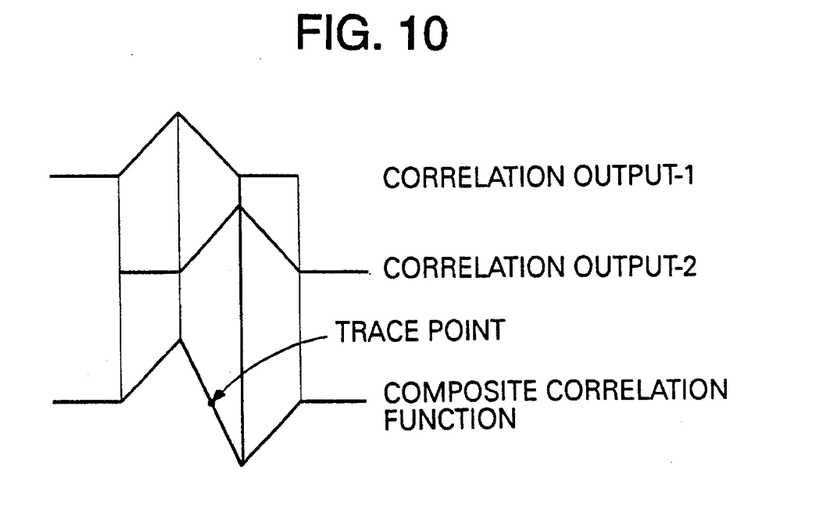
FIG. 10 is a diagram for explaining a detection of a trace point in a delay lock in the first embodiment.

After the synchronization is captured, tracking the synchronization is performed. In the spread spectrum modulation, after the synchronization is captured once, the clock condition is necessary to be maintained by controlling the decoding signal based on the standard signal to track the phase of the received coding signal. For this tracking operation, the tau-dither tracking method, the delay lock method, the carrier wave lock method etc., may be employed. The tau-dither tracking method is such a method to capture the top portion of an triangle shape of the correlation waveform by slightly changing the clock by use of the fact that the correlation becomes the waveform having the triangle shape. The delay lock method is such a method to use as inputs the correlation signal from the spread demodulation circuit 6 and the correlation signal delayed by 1 bit from this correlation signal, and to add those two correlation inputs after inverting the phase of one of the two, so that the tracking point (zero-crossing point) which appears at this time is captured and the phase synchronization is achieved at the vicinity of the correlation output as shown in FIG. 10. Any of those tracking methods can be applied to the present embodiment.

Finally, when the synchronization capturing and tracking operations are accomplished, the phase lock circuit 7 supplies the standard signal, which is substantially constant, to the M-sequence code generation circuit 8. The M-sequence code generation circuit 8 supplies the decoding signal, which is the cyclic code, to the spread demodulation circuit 6 in accordance with the standard signal. The data demodulation circuit 9 supplies the correlation output for tracking the synchronization to the phase lock circuit 7, and demodulates the primarily modulated signal to be original data $z$ which is coincident with one of the data $a$ to data $x$.

In order to change the channel i.e. the spread spectrum modulated signal related to one of the transmitter which is received and demodulated, the M-sequence code generation circuit 8 changes the amount to delay the output data in accordance with the supplied select signal S. A digital delay element can be utilized for this change. By prescribing the shift of the phase between the channels by certain bits, the M-sequence code generation circuit 8 shifts the phase by this certain bits. During this period, the synchronization is not disturbed, so that the synchronization capture can be automatically done even with respect to a new channel. If the assignment information as for the self channel number etc., is included in the data transmitted by the transmitters T1 to Tn, it becomes possible to judge how many bits should be shifted to capture the synchronization of the new channel by use of the correlation between the newly desired channel and the channel which synchronization is firstly captured. Therefore, the synchronization of the desired channel is finally achieved and the selection can be performed. The select signal S is managed by the CPU of the receiving system. The CPU of the receiving system manages the channel number, which is specified by the user, and the channel number, which is captured at the present, and controls the M-sequence code generation circuit 8 as the occasion demands.

According to the above explained first embodiment, the transmission and the reception of the multiplexed spread-spectrum-modulated signals can be performed by use of the M-sequence code. The desirable density of multiplex can be obtained by adjusting the number of the stages and the contents of the code of the M-sequence code. On the side of the receiver, by performing the synchronization capture and the phase change, the desired channel can be selected from the multiplexed signals, so that the original signal of the corresponding transmitter can be demodulated. According to this embodiment, since there is no need to capture the signal exclusive for synchronization during the transmission path, the whole system can be simply constituted.

Second Embodiment

The second embodiment is an embodiment in which the present invention is applied to a CATV (Cable TV) system. In this second embodiment, a user unit to receive a CATV service corresponds to the transmitter in the first embodiment while a center unit corresponds to the receiver in the first embodiment.

Figure 11:
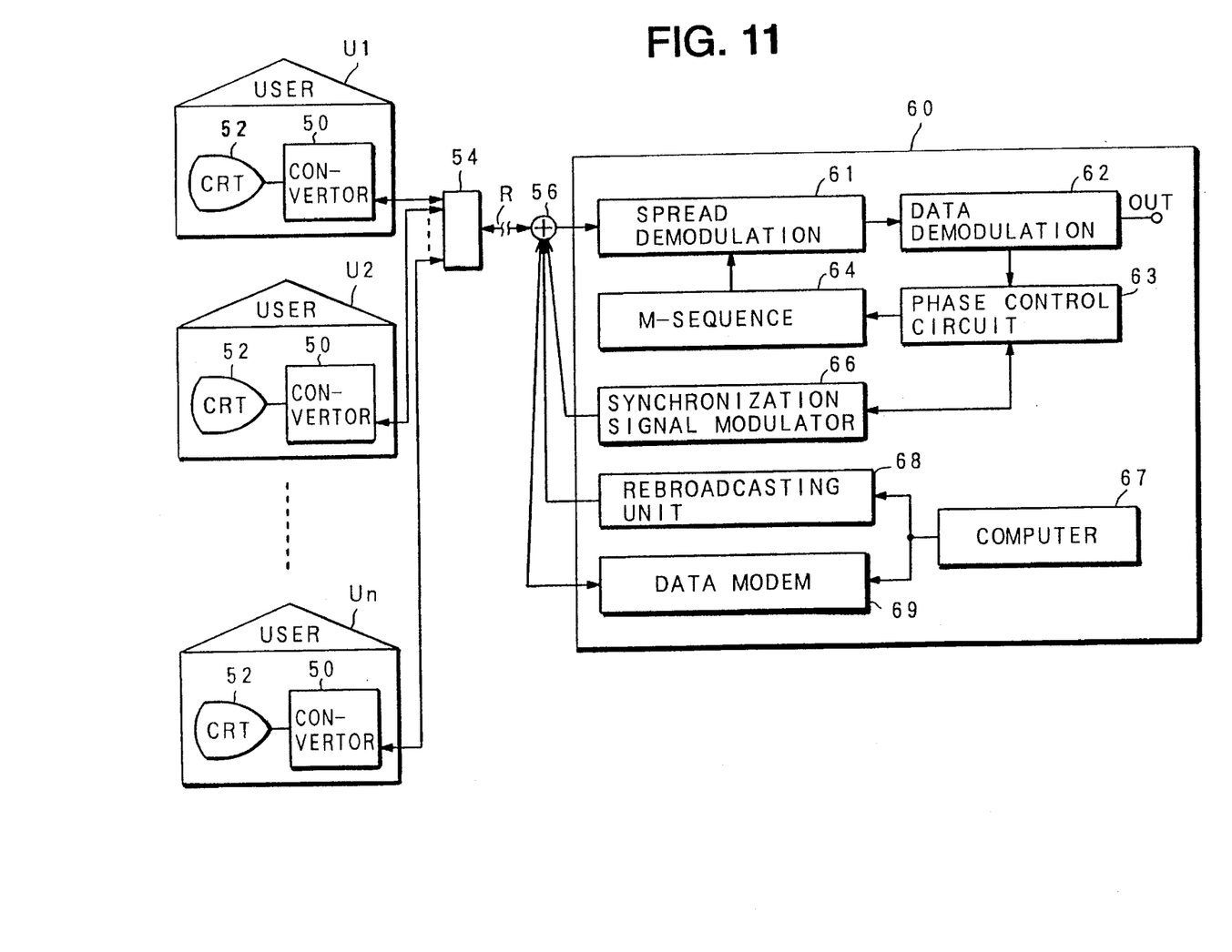
FIG. 11 is a block diagram of a spread spectrum transmitting and receiving apparatuses as a second embodiment of the present invention.

The spread spectrum transmitting and receiving apparatuses of the second embodiment is shown in FIG. 11.

In FIG. 11, the information from a center unit 60 is transmitted to user units U1 to Un through a transmission path R.

Each of the user units U1 to Un is provided with a convector 50 and a CRT (Cathode Ray Tube) 52.

The center unit 60 is provided with: a rebroadcasting unit 68 for frequency-modulating an ordinary TV program and transmitting it, as a controlling portion of the CATV broadcast; a data modem 69 for receiving and transmitting an upward signal transmitted from the user unit and the downward signal to the user unit as digitally modulated data in the two way CATV; and a computer 67 for controlling the center unit 60 on the whole.

The block for receiving the spread-spectrum modulated signal of the center unit 60 is provided with: a spread demodulation circuit 61 for spread-spectrum-demodulating the received signal to be the primarily modulated signal; a data demodulation circuit 62 for demodulating the primarily modulated signal to the original signal; a phase control circuit 63; and an M-sequence code generation circuit 64, so that the receiving block of the center unit 60 is constituted in the same manner as the receiver 1 of the first embodiment. The center unit 60 is further provided with a synchronization signal modulator 66 for generating a standard signal for the synchronization capturing operation.

The signals from the rebroadcasting unit 68, the data modem 69 and the synchronization signal modulator 66 are added or superimposed by an adder 56, and are transmitted to the transmission path R. The downward signal from the center unit 60 is transmitted through the distributer 54 to the user units U1 to Un, and the upward signals from the user units U1 to Un are transmitted to the center unit 60. The transmission path R and the distributer 54 are simply illustrated in the figure, but they are in fact installed over the large area and are constructed with a plurality of line amplifiers, a plurality of line branching amplifiers, a plurality of tapoffs and a transmission cable of long distance.

Figure 12:
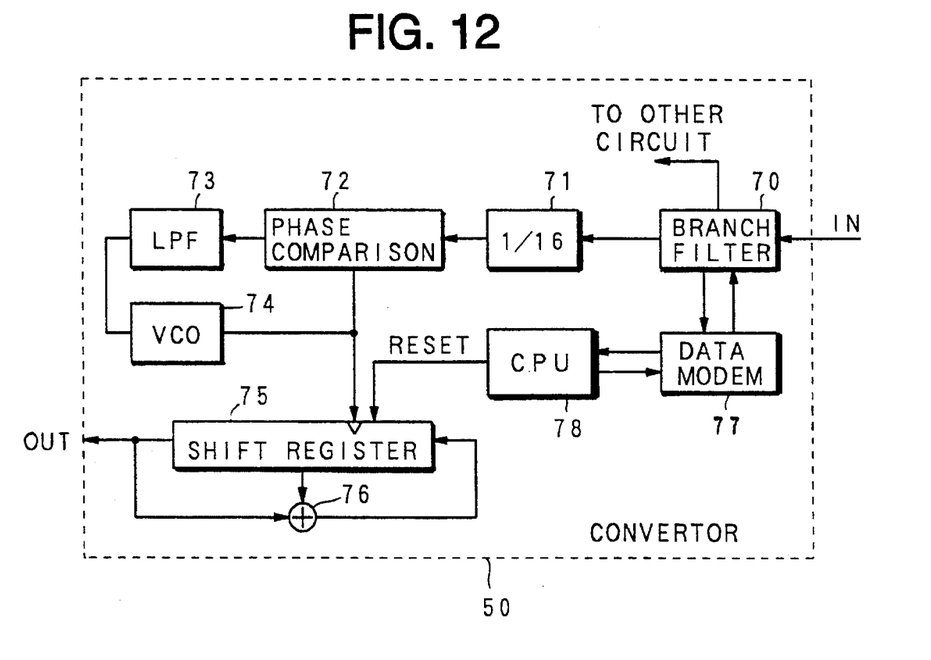
FIG. 12 is a block diagram of a code generating portion of a convector in the second embodiment.

FIG. 12 shows a portion for generating a code in the convector 50 used in each of the user units U1 to Un in the second embodiment.

In FIG. 12, the code generation block is provided with: a branch filter 70 for branching the input signal to each circuit by use of a filter etc.; a 16-dividing circuit 71 for dividing the frequency of the branched synchronization signal by 16; a phase comparison circuit 72 for comparing the phase of the synchronization signal, which has been divided by 16, with the phase of the partial oscillation frequency of a VCO (Voltage Controlled Oscillator) 74; a low pass filter (LPF) 73 for forming a waveform of the result of the phase comparison; the VCO circuit 74 for increasing and decreasing the frequency of the standard signal on the basis of a driving signal outputted from the low pass filter 73; a shift register 75 for generating the coding signal which is the M-sequence code on the basis of the standard signal oscillated by the VCO circuit 74; an adder 76; a data modem 77 for communicating the digital signals with the branch filter 70; a CPU 78 for performing the communication of the digital data with the center unit 60 via the data modem 77 and for outputting a reset signal to reset the shift register 75 at an appropriate timing.

Nextly, the operation of the second embodiment will be explained.

The second embodiment is not constructed to achieve the synchronization between the transmitters (corresponding to the user units U1 to Un) by use of the synchronization clock line 100 as in the first embodiment of FIG. 8. If the places where the transmitters exist are close to each other, the operation of the first embodiment is practically possible since the wire line such as a synchronization clock line can be installed. However, as in the CATV system in which the user units are spread over a large area, this wire line cannot be practically usable. Therefore, in the second embodiment, the synchronization signal is modulated and transmitted onto the transmission path R from the center unit 60, and each of the user units receives this synchronization signal and generates the phase for transmission in correspondence with the received signal.

The CATV is an information service which is transmitted from the center to the user who has engaged with the center. In the ordinary CATV system, the signals for rebroadcast of the signals from the existing broadcasting stations, the signals of self-broadcast by use of the self programs etc., are transmitted to the users through a cable from the center unit (these signals are referred to as "downward signals"). On the other hand, in the two-way CATV system, other than the downward signals, the users can transmit signals to the center by the poling method (these signals are referred to as "upward signals").

In FIG. 11, at the center unit 60, the spread demodulation circuit 61, the data demodulation circuit 62, the phase control circuit 63 and the M-sequence code generation circuit 64 perform the operations same as those in the first embodiment and the detailed explanations thereof are omitted here. However, the phase control circuit 63 supplies the synchronization signal, which is synchronized with the standard signal supplied to the M-sequence code generation circuit 64, to the synchronization signal modulator 66. The synchronization signal modulator 66 generates a carrier wave having a predetermined frequency (e.g. 128 [MHz]), and supplies it to the transmission path R as the downward signal so that this carrier wave may allow the converter 50 to achieve the synchronization operation (i.e. generate the phase for the upward signal). This carrier wave may be AM-modulated by the synchronization signal modulator 66.

Each of the user units U1 to Un receives this synchronization signal and branches the component of this predetermined frequency band from the received signal by use of the branch filter 70 in FIG. 12. This branched synchronization signal is 16-divided in frequency by the 16-divider 71 and is supplied to the phase comparison circuit 72 (for example, if the synchronization signal has the frequency of 128 [MHz], the 16-divided signal has the frequency of 8 [MHz]). The phase comparison circuit 72, the low pass filter 73 and the VCO circuit 74 constitute a so-called PLL (Phase Lock Loop), so that the standard signal outputted from the VCO circuit 74 is supplied to the shift register 75 in FIG. 12 as a signal which is synchronized with the synchronization signal supplied from the center unit 60 in FIG. 11.

In FIG. 12, the register 75 generates the M-sequence code from its initial value in accordance with the standard signal when the reset signal is released by the CPU 78. The operation after this stage of the shift register 75 are the same as those of the transmitter in the first embodiment. This M-sequence code is supplied to the spread modulation circuit as a coding signal. Then, the primarily modulated signal, which is separately supplied thereto, is spread-spectrum-modulated by use of this coding signal, and is transmitted to the center unit 60 through the transmission path R via the branch filter 70.

In order to perform the phase adjustment of the spread-spectrum-modulated signal between the user units, following operations are performed.

Namely, the center unit 60 specifies the address assigned to the user units U1 to Un, and transmits to each user unit the command indicating the transmission allowance to allow the user unit to transmit the signal, which is held by the convector 50 and is to be transmitted, through the data modem 69. At the same time, the center unit 60 transmits the signal to release the reset for the M-sequence code generation. The CPU 78 in each user units monitors the downward signal, which is inputted through the data modem 77, and performs a preparation for spread spectrum modulation and transmission if the address of the pertinent user unit is specified.

Firstly, the signal to be transmitted is read from a memory etc., and the preparation for transmission is performed. Nextly, the CPU 78 releases the reset signal. Then, the shift register 75 generates the cyclic code from the timing of releasing, and, at the same time, the modulation of the signal to be transmitted is started. This signal to be transmitted is spread-spectrum-modulated by the coding signal, which is the M-sequence code generated by the shift register 75, after the primary modulation, and is transmitted to the center unit 60 as the upward signal.

Since the timing of the reset signal transmission is different from the user unit to the user unit which is specified, the phase at which the self correlation has the sharp peak is different from user unit to user unit. Therefore, while the specified user units transmit the signal to be transmitted, it becomes possible to multiplex the spread-spectrum-modulated signals. The transmission band range for those multiplexed spread-spectrum-modulated signals becomes 20±8 [MHz], for example, on condition that the frequency of the carrier wave is 20 [MHz] and the frequency of the synchronization signal is 128 [MHz] since the coding signal becomes 8 [MHz].

The center unit 60 can capture the synchronization of the multiplexed spread-spectrum-modulated signal by the operation same as that in the first embodiment and can read the desired channel in order.

In addition, the center unit 60 may transmit the command for each of the users separately in the condition where the multiplex is not done, and transmit the data by the spread-spectrum-modulation. Alternatively, the communication system may be constructed such that a trigger timing information to be the standard is inserted in the synchronization signal and the offset time from the trigger to the release of the reset is specified for each of the users separately. On this occasion, the reset is released after counting the predetermined number of the standard signals from the trigger on the side of the user. By this constitution, it is possible to increase the multiplex density between a plurality of users.

As described above, according to the second embodiment, it is not necessary to achieve the synchronization between the user units and it is possible to perform unified management by the center unit. It is also possible to transmit various data such as toll program watching historical data, toll program watcher application data etc. to the center unit through the cable by virtue of the peculiarity of the CATV. Since the wide band range transmission lower than the noise level is performed, it is hardly influenced by the external disturbance. Since the signal to be transmitted is coded and the capability of keeping secret is superior in some degree, the transmission of the individual information can be safely transmitted.

Further, the present embodiment can be applied to a system for transmitting the multiplexed spread-spectrum-modulated signals onto a telephone line other than the service line.

Furthermore, the CATV is assumed in the second embodiment, the present embodiment can be applied to the CCTV (Closed Circuit TV) in the same manner.

Other Modified Embodiment

As the spread spectrum modulation of the above embodiments, various digital modulation method may be employed such as the PSK modulation, the QPSK modulation, the FSK modulation, PAM modulation and so on.

Further, for the phase control of the M-sequence code, various controlling element can be employed such as a digital shift register, a flipflop, a delay line and so on, in place of the phase adjustment element in the above embodiments.

As described above in detail, according to the communication method of the present embodiments, the spread spectrum modulation communication can be performed by use of the M-sequence codes, which have the good spread characteristic, on the transmitting side. On the other hand, the multiplexed spread-spectrum-modulated signals can be received without suffering from external disturbances or noises, so that desired one of the data signals can be selectively demodulated on the receiving side. Further, even if there exists a jitter or fluctuation in the clock for generating the decoding signal on the receiving side, the system ability can be stabilized since the cross correlation value is kept constant.

According to the transmitting apparatus of the present embodiments, the spread spectrum modulation can be performed by use of the M-sequence codes, which have the good spread characteristic, multiplexed and transmitted.

According to the receiving apparatus of the present embodiments, the multiplexed spread-spectrum-modulated signals can be received without suffering from external disturbances or noise, so that desired one of the data signals can be selectively demodulated. Further, even if there exists a jitter or fluctuation in the clock for generating the decoding signal, the receiving ability can be stabilized since the cross correlation value is kept constant.

According to the communication apparatus of the present embodiments, the multiplexed spread-spectrum modulated signals, which are modulated by the M-sequence codes, can be transmitted and received without suffering from external disturbances or noises, and the large volume of the spread-spectrum-modulated signals can be stably transmitted and received.

According to the communication apparatus of the second embodiment, even if the transmission path is a public line such as a CATV, the standard signal transmitted from the receiving side can be commonly used between the transmitters. Thus, it is not necessary to install a line exclusive for achieving the predetermined time relationships on the transmitting side, so that the spread spectrum communication system can be realized quite easily.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spread spectrum communication method comprising the steps of:

spread-spectrum-modulating each of a plurality of data signals to be transmitted at transmitting units on the basis of a plurality of coding signals respectively assigned to the data signals, said coding signals comprising M-sequence codes, which have code patterns same to each other and which phases are sequentially shifted from each other;

multiplexing the spread-spectrum-modulated signals at the transmitting units;

transmitting the multiplexed spread-spectrum modulated signals through a transmission path from the transmitting units;

receiving the transmitted spread-spectrum-modulated signals at a receiving apparatus;

generating a synchronization signal at the receiving apparatus by a phase lock loop to be in synchronization with the phase of a desired one of the received spread-spectrum-modulated signals;

selectively demodulating the desired one of the received spread-spectrum-modulated signals at the receiving apparatus by spread-spectrum-demodulating the received spread-spectrum-modulated signals on the basis of a decoding signal comprising a M-sequence code, which has a code pattern same as that of the coding signals and which phase is variable, and by controlling the phase of the decoding signal to be in synchronization with the phase of the coding signal assigned to the desired one of the received spread-spectrum-modulated signals on the basis of the generated synchronization signal;

transmitting the generated synchronization signal from the receiving apparatus to the transmitting units through the transmission path;

receiving the transmitted synchronization signal at each of the transmitting units;

branching the received synchronization signal by a branch filter at each of the transmitting units;

generating a common standard signal on the basis of the branched synchronization signal by a phase lock loop at each of the transmitting units; and generating the M-sequence code at each of the transmitting units by a shift register such that the phases of the M-sequence codes are shifted from each other on the basis of the generated common standard signal.

2. A spread spectrum communication method according to claim 1, wherein the spread-spectrum-modulating step and the spread-spectrum-demodulating step are performed by means of a modulation method selected from a group consisting of PSK (Phase Shift Keying), QPSK (Quad PSK), FSK (Frequency Shift Keying), ASK (Amplitude Shift Keying), FM (Frequency Modulation), AM (Amplitude Modulation) and PAM (Pulse Amplitude Modulation).

3. A spread spectrum communication method according to claim 1, further comprising the steps of:
   primarily-modulating a plurality of original signals to be the data signals before the spread-spectrum-modulating step; and
   secondarily-demodulating the spread-spectrum-demodulated signals to recover the original signals.

4. A spread spectrum communication method according to claim 3, wherein the primarily-modulating step and the secondarily-demodulating step are performed by means of one modulation method selected form a group consisting of AM (Amplitude Modulation), PAM (Pulse Amplitude Modulation), FM (Frequency Modulation), ASK (Amplitude Shift Keying) modulation and FSK (Frequency Shift Keying) modulation.

5. A spread spectrum communication method according to claim 1, wherein said receiving apparatus comprises a CATV center unit for transmitting broadcast signals through said transmission path in response to a request by the received spread-spectrum-modulated signal, and said transmitting units comprises user units.

6. A spread spectrum transmitting apparatus for transmitting spread-spectrum-modulated signals to a receiving apparatus, comprising:
   a plurality of code generation units for generating a plurality of coding signals respectively assigned to a plurality of data signals to be transmitted, said coding signals comprising M-sequence codes which have code patterns same to each other and which phases are sequentially shifted from each other;
   a plurality of modulation units for spread-spectrum-modulating the data signals respectively on the basis of the coding signals generated by said code generation units;
   a multiplex means for multiplexing the spread-spectrum-modulated signals;
   a transmitting means for transmitting the multiplexed spread-spectrum-modulated signals through a transmission path to the receiving apparatus;
   a receiving means for receiving a synchronization signal from the receiving apparatus, said synchronization signal being generated by the receiving apparatus to be in synchronization with the phase of a desired one of the transmitted spread-spectrum-modulated signals and being transmitted from the receiving apparatus through the transmission path;
   a plurality of branch filters for branching the received synchronization signal for the modulation units respective;
   a plurality of phase lock loops for generating standard signals respectively on the basis of the branched synchronization signal; and
   a plurality of shift registers for generating the M-sequence codes for said modulation units respectively such that the phases of the M-sequence codes are shifted from each other on the basis of the respective generated standard signals.

7. A spread spectrum transmitting apparatus according to claim 6, wherein said receiving apparatus comprises a CATV center unit for transmitting broadcast signals through said transmission path in response to a request by the received spread-spectrum-modulated signal, and said transmitting apparatus comprises user units.

8. A spread spectrum receiving apparatus for receiving multiplexed spread-spectrum-modulated signals from a transmitting apparatus through a transmission path, said multiplexed spread-spectrum-modulated signals being obtained by modulating a plurality of data signals to be transmitted on the basis of a plurality of coding signals respectively assigned to the data signals, said coding signals comprising M-sequence codes which have code patterns same to each other and which phases are sequentially shifted from each other, said receiving apparatus comprising:
   a signal generation means for generating a synchronization signal by a phase lock loop to be in synchronization with the phase of a desired one of the received spread-spectrum-modulated signals;
   a transmitting means for transmitting the generated synchronization signal to the transmitting apparatus through the transmission path;
   a code generation unit for generating a decoding signal, said decoding signal comprising a M-sequence code, which has a same code pattern as that of the coding signals and which phase is variable; and
   a demodulation unit for selectively demodulating the desired one of the received spread-spectrum-modulated signals by spread-spectrum-demodulating the received spread-spectrum-modulated signals on the basis of the decoding signal by controlling said code generation unit to vary the phase of the decoding signal so as to be in synchronization with the phase of the coding signal assigned to the desired one of the received spread-spectrum-modulated signals on the basis of the generated synchronization signal.

9. A spread spectrum transmitting apparatus according to claim 8, wherein said receiving apparatus comprises a CATV center unit for transmitting broadcast signals through said transmission path in response to a request by the received spread-spectrum-modulated signal, and said transmitting apparatus comprises user units.

10. A spread spectrum communication apparatus comprising a transmitting apparatus and a receiving apparatus,
   said transmitting apparatus comprising:
   a plurality of first code generation units for generating a plurality of coding signals respectively assigned to a plurality of data signals to be transmitted, said coding signals comprising M-sequence codes which have code patterns same to each other and which phases are sequentially shifted from each other;
   a plurality of modulation units for spread-spectrum-modulating the data signals respectively on the basis of the coding signals generated by said first code generation units;
   a multiplex means for multiplexing the spread-spectrum-modulated signals;
   a first transmitting means for transmitting the multiplexed spread-spectrum-modulated signals through a transmission path to said receiving apparatus; and
   a first receiving means for receiving a synchronization signal from said receiving apparatus,
   said receiving apparatus comprising:
   a signal generation means for generating a synchronization signal by a phase lock loop to be in synchronization with the phase of a desired one of the received spread-spectrum-modulated signals;

a second transmitting means for transmitting the generated synchronization signal to said transmitting apparatus through the transmission path;

a second code generation unit for generating a decoding signal, said decoding signal comprising a M-sequence code, which has a same code pattern as that of the coding signals and which phase is variable; and a demodulation unit for selectively demodulating the desired one of the received spread-spectrum-modulated signals by spread-spectrum-demodulating the receiving spread-spectrum-modulated signals on the basis of the decoding signal by controlling said second code generation unit to vary the phase of the decoding signal so as to be in synchronization with the phase of the coding signal assigned to the desired one of the received spread-spectrum-modulated signals on the basis of the generated synchronization signal, said transmitting apparatus further comprising:

a receiving means for receiving the transmitted synchronization signal;

a plurality of branch filters for branching the received synchronization signal for the modulation units respectively;

a plurality of phase lock loops for generating standard signals respectively on the basis of the branched synchronization signal; and a plurality of shift registers for generating the M-sequence codes for said modulation units respectively such that the phases of the M-sequence codes are shifted from each other on the basis of the respective generated standard signals.

11. A spread spectrum communication apparatus according to claim 10, said transmitting apparatus further comprising a plurality of primarily-modulating units for primarily-modulating a plurality of original signals and outputting the data signals to said modulation units, respectively, said receiving apparatus further comprising a secondarily-demodulating unit for secondarily-demodulating the spread-spectrum-demodulated signal to recover the original signal corresponding to the desired one of the transmitted signals.

12. A spread spectrum communication apparatus according to claim 10 wherein:

said first code generation units generate the coding signals such that the phases of said coding signals are shifted by a predetermined time period; and said demodulation unit controls the second code generation unit to vary the phase of the decoding signal by said predetermined time period when changing the desired one of the transmitted signals.

13. A spread spectrum communication apparatus according to claim 10, wherein said receiving apparatus comprises a CATV center unit for transmitting broadcast signals through said transmission path in response to a request by the received spread-spectrum-modulated signal, and said transmitting apparatus comprises user units.

\* \* \* \* \*